United States Patent Office                                        3,332,216
                                                                Patented July 25, 1967

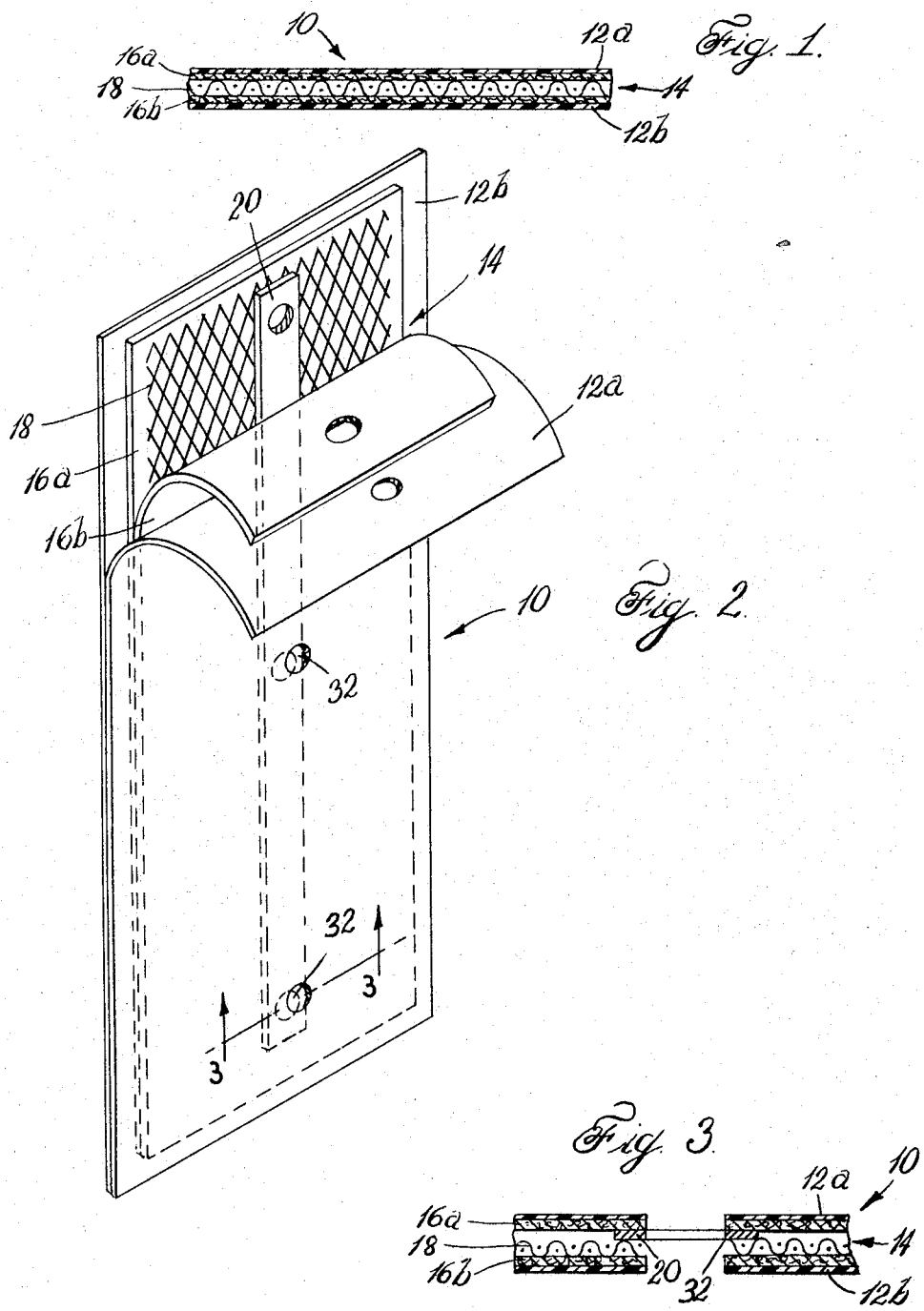

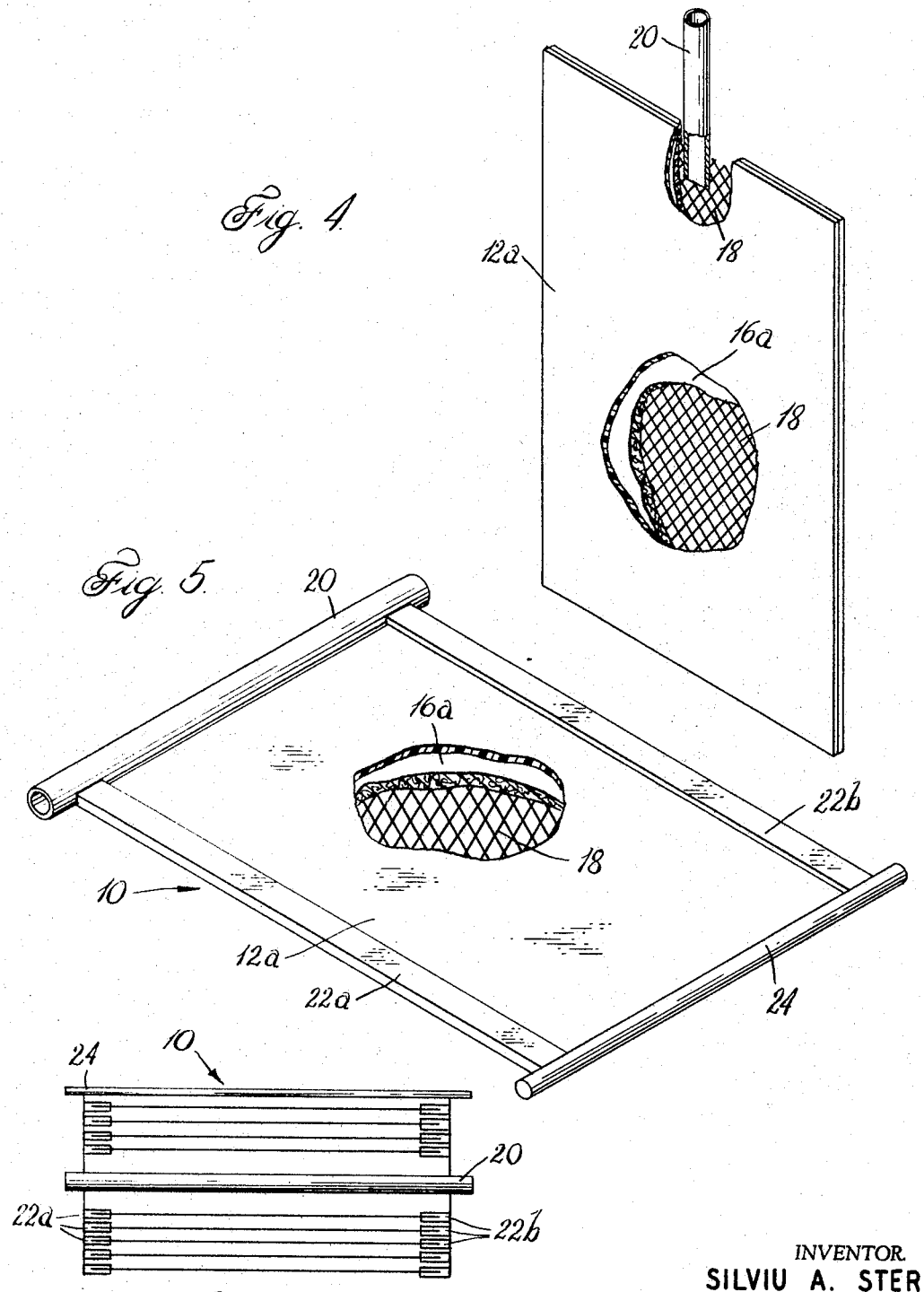

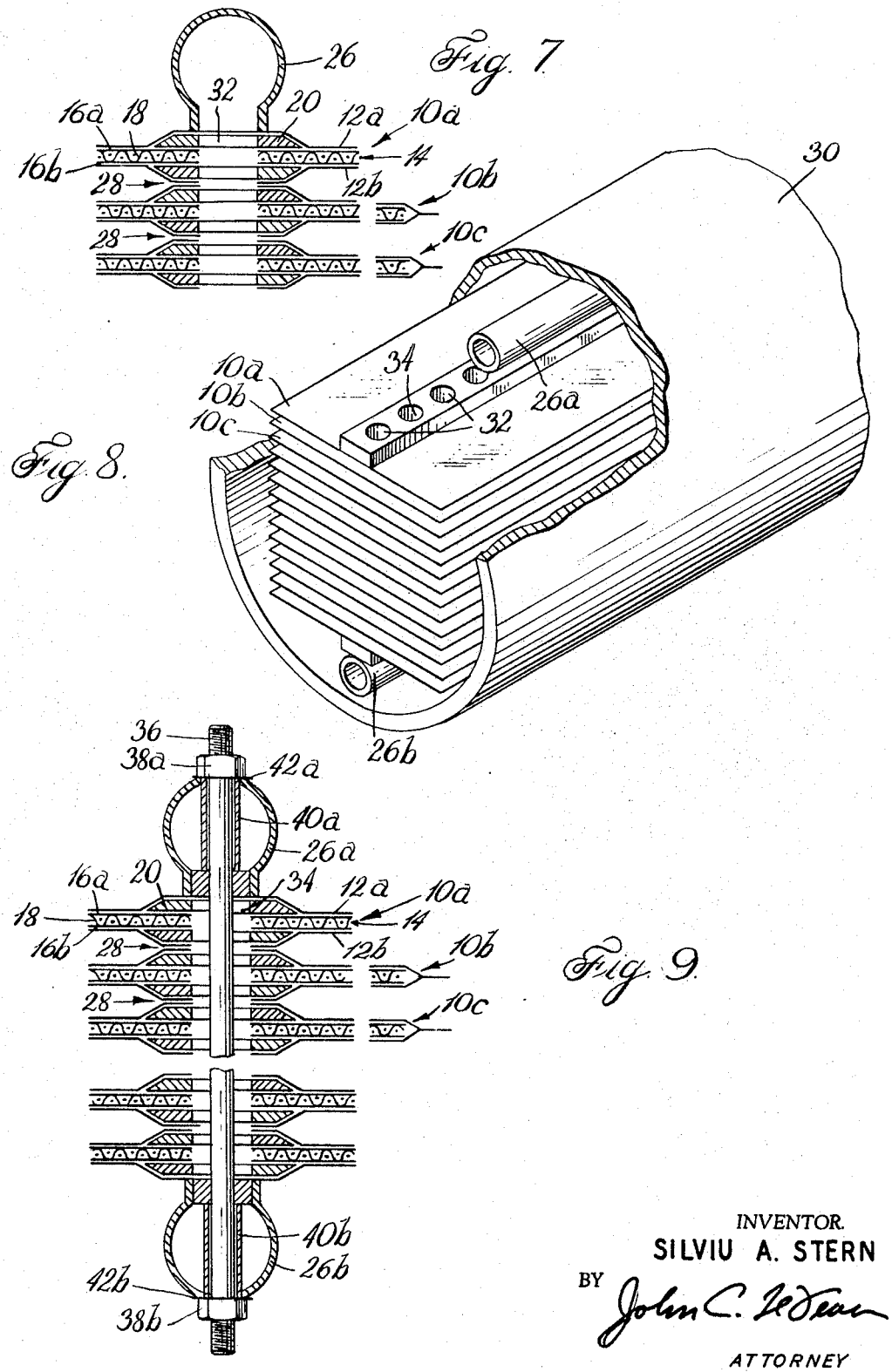

3,332,216
FLUID PERMEATION APPARATUS
Silviu A. Stern, Eggertsville, N.Y., assignor to Union Carbide Corporation, a corporation of New York
Filed Mar. 16, 1964, Ser. No. 351,978
7 Claims. (Cl. 55—158)

This invention relates to apparatus for separating fluids by selective permeation through nonporous, selectively permeable barriers.

A primary object of the present invention is to provide an improved selective permeation apparatus. Another object is to provide an improved apparatus for supporting nonporous, selectively permeable barriers. These and other objects and advantages of the present invention are described hereinafter in conjunction with the accompanying drawings, of which:

FIGURE 1 is a partial view in section of a permeation septum illustrating the present invention.

FIGURE 2 is a perspective view of a permeation septum illustrating other features of the present invention.

FIGURE 3 is a partial view in section of a permeation septum taken along the lines 3—3 of FIGURE 2.

FIGURES 4 and 5 are perspective views partially in section of a permeation septum illustrating still other features of the present invention.

FIGURE 6 is a diagrammatic view in section of a permeation septum similar to that shown in FIGURE 5 helically wound into a cylinder.

FIGURES 7 and 9 are partial views in section of a permeation apparatus illustrating features of the present invention.

FIGURE 8 is a partial view partially in section of a permeation apparatus illustrating other features of the present invention.

Figure 10:
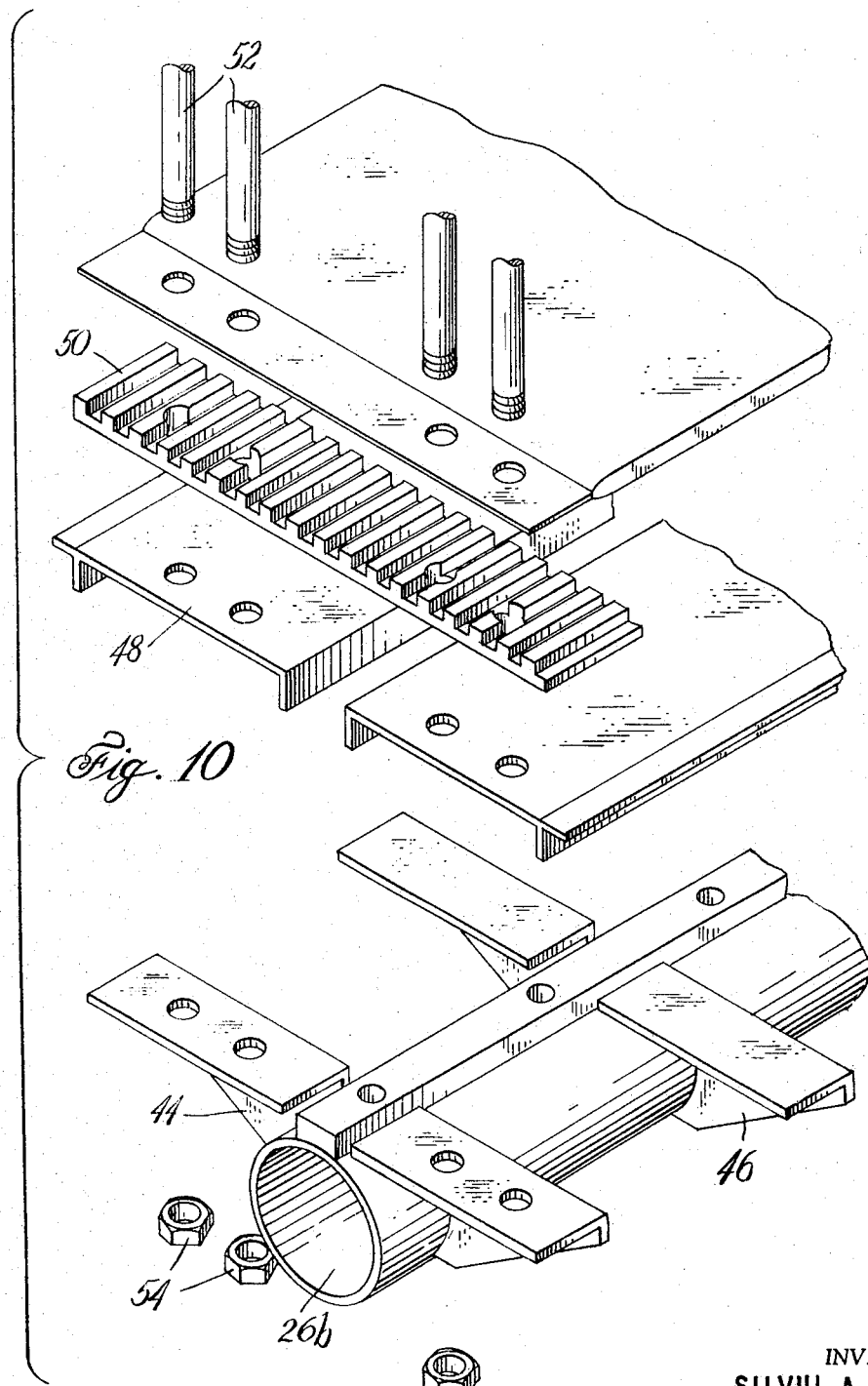
FIGURE 10 is an exploded partial view of a permeation apparatus illustrating still other features of the present invention.

The rate of permeation through a nonporous, selectively permeable barrier is controlled by a complex combination phenomena involving the chemical composition of the fluid mixtures to be separated by permeation; the chemical composition of the barrier; the temperature of the process; the barrier surface area and thickness; and the difference in the concentration of the selectively permeable component of the fluid mixture across the barrier. In the case of gas separation by permeation, the concentration difference may be expressed as the difference in the partial pressure of the selectively permeable component of the fluid mixture across the barrier. Usually, the fluid mixture, the selectively permeable component of the fluid mixture, the most suitable barrier, and the temperature of the process are predetermined, leaving, as the only alterable factors, the barrier surface area and thickness, and the partial pressure differential—or the concentration differential—of the selectively permeable component. Preferably, barriers having large surfaces and small thicknesses capable of withstanding large pressure differentials should be used. Consequently, any improvement in the rate of permeation is largely dependent on designing the permeation apparatus to permit use of thin barriers having large surfaces and to achieve as large a partial pressure differential—or a concentration differential—of the selectively permeable component as possible across the barrier.

In general, a nonporous, selectively permeable barrier having a thickness greater than about 0.005 inch is useless in a practical permeation process because the rate of permeation through a barrier of such thickness would be impractically slow. At the present time, barriers having a thickness between about 0.002 inch and 0.001 inch are used and even thinner barriers would be preferred if they could be manufactured without pinholes. Barriers having thicknesses of this magnitude are extremely fragile and great care must be taken to insure their adequate support against the relatively high pressures used in permeation processes.

Adequate support for a barrier having maximum surface area is not the only consideration in the design of a barrier supporting structure however; an equally important consideration being the ease with which the permeated fraction of the fluid mixture (hereinafter called the permeate) flows away from the permeate side of the barrier. This is usually considered in terms of permeate flow resistance or pressure drop between the permeate side of the barrier and the point of permeate withdrawal from the permeation apparatus. If the permeate flow resistance is excessive, the partial pressure differential of the selectively permeable component may decrease to the point where the permeation process becomes impractical.

As an example, consider a typical gaseous permeation process using a 0.001 inch thick barrier comprised essentially of a copolymer of polytetrafluoroethylene and hexafluoropropylene for recovering 80% of the helium from a natural gas fluid mixture pressurized to 67 atm. and having the following composition (mol-percent):

|  | Percent |
|---|---|
| $CH_4$ | 76.43 |
| $N_2$ | 17.06 |
| $C_2$ hydrocarbons | 6.06 |
| He | 0.45 |

Now if the permeate flow resistance is such that the pressure on the permeate side of the barrier is 0.1 atm. absolute, a permeate containing 4.3% helium can be obtained with a permeation driving force of 4.435 p.s.i. The driving force is computed as the difference between the partial pressure of helium upstream of the membrane ($.45\% \times 67 \times 15 = 4.5$ p.s.i.) and downstream of the membrane ($4.3\% \times 0.1 \times 15 = .065$ p.s.i.) or $4.5 - .065 = 4.435$ p.s.i. If the permeate flow resistance is higher, however, such that the pressure under the barrier is 1.0 atm. absolute (zero p.s.i. gage), then the content of the permeate drops to 3.7% helium and the driving force drops to only 3.945 p.s.i. As before the driving force is the difference between the partial pressure upstream (4.5 p.s.i.) and downstream ($3.7\% \times 1.0 \times 15 = 0.555$) or $$4.5 - 0.555 = 3.945$$

p.s.i. Thus, the driving force has been reduced by over 10%, which means that the rate of permeation per unit area of barrier has been reduced by this fraction. At the same time, the helium content of the permeate has dropped 14% (4.3% to 3.7%) thereby requiring that the permeate stream be a proportionately larger fraction of the feed in order to achieve the same 80% helium recovery. These two factors—lower permeation rate and higher permeation volume—are the result of higher pressure beneath the barrier, and these factors combine to require a much greater area of permeation barrier.

The feasibility of maintaining low pressure beneath the barrier depends upon the pressure drop encountered by the permeate flowing to its point of withdrawal. The permeate must be pumped through its withdrawal channel and if the pressure drop is high then it may well be impractical or even impossible to maintain a desired low pressure under the barrier. For example, it is clearly impossible to maintain 0.1 atm. abs. pressure under the barrier if the pressure drop through the permeate withdrawal channel is 0.2 atm.

In the above example for helium recovery from natural gas, the total fraction of the feed stream permeated through the barrier is on the order of 5–10%. In other applications, the fraction may be considerably greater; for example, in hydrogen permeation, 70% or more of the feed may be permeated. Furthermore, the rate of hydrogen permeation per unit area of barrier may be many times greater than the rate of helium permeation. In such instances, the permeation flow rate under the barrier is very high; and it is even more important to achieve low pressure drop within the permeator support structure.

Variations in fluid mixture (feed) pressure also affect the partial pressure differential of the selectively permeable component, but to a much lesser extent than do changes in permeate pressure beneath the barrier. In the above example, an increase of only 0.9 atm. permeate pressure beneath the barrier caused a reduction of about 10% in the partial pressure differential. A decrease of 7.5 atm. (112.5 p.s.i.) in the feed pressure would be required to produce a similar effect on the partial pressure differential.

Two general types of barrier supporting structures have been suggested. One type comprising a porous pressure-bearing wall which divides a permeation chamber into high and low pressure sections such that a relatively high pressure fluid mixture within the permeation chamber can contact the outer barrier surface facing into the high-pressure section and selectively permeate through the barrier and the supporting structure into the open low pressure section of the permeation chamber. Supporting structures of this type must be sufficiently strong and rigid to withstand high bending stresses and strains created by the pressure differential across the barrier. The considerable space occupied by a supporting structure of this type, combined with the open space necessarily provided in the low-pressure section of the permeation chamber, markedly limits the surface area of barrier which can be provided in a unit volume of the permeation chamber.

The other type of supporting structure comprises a porous material sandwiched contiguously between two barriers and placed into a permeation chamber such that a relatively high pressure fluid mixture within the permeation chamber can contact the outer surfaces of the two barriers and selectively permeate through the barriers into, and laterally through, the interior of the porous support structure, the support structure interior being maintained at a low pressure. This type of supporting structure has the advantage that a single structure will support twice as much barrier surface area as a structure of the first type. Furthermore, a supporting structure of the second type need not possess high strength or rigidity since it is not exposed to bending stresses—adequate resistance to compressive forces being the only requirement. Thus, from the standpoint of strength, barrier supporting structures of the second type can be simpler and less space-consuming than those of the first type.

Supporting structures of the first type, however, have the advantage that they need be porous only in the direction normal to the barrier surface, because the low-pressure section of the permeation chamber is open to permeate flow in the lateral direction. With proper reinforcement, a material such as very fine screen may be used to support the barrier, and the pressure drop of the permeated fluid across the support is negligible. Therefore, substantially the entire pressure differential between the two sections of the permeation chamber occur across the barrier. This is desirable because any pressure drop attributable to the supporting structure decreases the actual pressure differential occurring across the barrier, thereby decreasing the driving force of the permeation process. On the other hand, supporting structures of the second type must exhibit low flow resistance in directions both normal and parallel to the barrier surface in order that the permeate may flow freely between the two barriers to some common point of collection and withdrawal. Material such as very fine screen is unsuitable because the high pressure of the fluid mixture would force the barriers into the screen matrices thereby obstructing the narrow flow channels within the interior of the supporting structure through which the permeated fluid must be withdrawn.

Many attempts at developing a practical permeation apparatus have been directed toward the second type of supporting structure in an attempt to utilize its advantage of high barrier surface area per unit chamber volume. Attempts have been made to employ a porous sintered metal plate as the supporting structure of the second type. However, such materials are not only expensive and heavy, but must be made relatively thick in order to conduct the total permeate from both barriers with reasonably low flow resistance. Fibrous materials have also been proposed for a supporting structure of the second type. While such material is relatively inexpensive and light, it is highly compressible and will be heavily compacted in service by the relatively high pressure of the fluid mixture into a very dense body having relatively low lateral porosity. For this reason, fibrous materials must also be provided in massive thickness in order to avoid excessive flow resistance to the permeate.

A common unit for measuring the ease with which a fluid passes through a porous material (flow conductance) is the darcy. Unit darcy conductance exists where one cubic centimeter of a fluid per second passes through a material having a surface area of one square centimeter when subjected to a pressure gradient of one atmosphere per centimeter thickness, the fluid having a viscosity of one centipoise. It has been found that for most permeation processes a flow conductance of at least 100–200 darcies will be required in sandwich type supporting structures of the second type in order that the permeation process be attractive when compared with other fluid separation methods such as distillation, partial condensation, absorption and adsorption.

The flow conductance of a highly porous filter paper was measured parallel to its surface in order to evaluate prior art methods of support. While the material is highly porous under normal, relaxed conditions, it become relatively nonporous under high compression. At 1000 p.s.i. compression, as might be employed for example in the separation of helium from natural gas, the flow conductance was only 13–17 darcies.

A similarly low flow conductance under compression was measured using a layer of rubberized, curled hair. Under 1000 p.s.i. compression, the conductance was 20–50 darcies.

Much higher flow conductance can be obtained with metal screen. For example, the flow conductance of 14 x 18 mesh metal screen welded between smooth plates parallel to the plane of the screen was measured as 985 darcies, 58 times the flow conductance of a 17-darcy filter paper. This means that a thickness of filter paper 58 times that of the screen would be required for equal conductance. Thus, if a 1/16-inch thickness of this screen were adequate for satisfactorily conducting a desired permeate flow rate, then a 3.6 inch compressed thickness of filter paper would be needed to achieve the same result. Furthermore, when initially installed in the uncompressed state, the thickness of the filter paper would have to be as much as four times the above compressed thickness. Such thicknesses demand unreasonably large volumes in the permeation chamber.

While metal screens provide high conductance, they do not adequately support and protect the fragile barrier. In many tests, it has been observed that barriers are heavily impressed or deformed into the openings of the support, thereby reducing the flow conductance of the screen and creating many points of high barrier stress. The barriers eventually crack or rupture. This inadequate support has been experienced with screens as fine as 100 mesh.

Thus, although the sandwich construction appears at first to offer a simple means for supporting a very large barrier area in a small volume, in practice a satisfactory supporting material has heretofore not been found which combines the requisite economy, thinness, and porosity.

It has been discovered that sandwich supporting structures of the second type can be made substantially as thin as desired without decreasing the actual pressure differential occurring across the barrier, by providing a supporting structure comprising a composite of special materials selected to perform certain distinct functions to be described subsequently. This composite structure readily permits using thicknesses less than one-half that of previously known practical supporting structures of the sandwich type. Consequently, the composite support structure of the present invention, by combining the preferred features of the two types of supporting structures described above, provides a permeation apparatus having a permeation rate per unit volume of space occupied at least 100% greater than any apparatus heretofore known.

As shown in FIGURE 1, the essential features of the permeation apparatus 10 of the present invention (hereinafter called a permeation septum) comprise two nonporous, selectively permeable barrier layers, 12a and 12b, between which is sandwiched a porous support structure 14 having two cushioning layers 16a and 16b. These cushioning layers contiguously support the barrier layers, 12a and 12b, and are spaced from each other and supported on a permeate-conducting layer 18.

The type of material chosen for the cushioning layers 16a and 16b depends on both the type of barrier layers 12a and 12b and the type of permeate-conducting layer 18 to be used. One requisite is that the porosity of the cushioning layers 16a and 16b normal to their surfaces must be substantially greater than the permeability of the barrier layers 12a and 12b. If the cushioning layer porosity normal to the cushioning layer surface is greater than the barrier permeability by an order of magnitude, the flow resistance or pressure drop across the cushioning layer is negligible in comparison to the pressure differential across the barrier layer. The porosity of the cushioning layers 16a and 16b parallel to their surfaces is unimportant because the cushioning layers do not conduct permeated fluid in a parallel direction but rather only in the normal direction from the inner or down-stream surface of the barrier into the permeate-conducting layer 18. Porosity in cushioning layers 16a and 16b must be achieved with a sufficiently fine grained structure that the fragile barrier will not be overstressed when forced contiguously against its surface under high pressure.

The cushioning layers 16a and 16b must also have sufficient strength to span across any openings in the permeate conducting layer 18 without appreciable sagging when compressed heavily by the high pressure exerted on the barriers by the fluid mixture. If the cushioning layers 16a and 16b sag or deform into openings in the permeate conducting layer 18, the barriers will be overstressed at localized points resulting in their rupture. Furthermore, deformation of the cushioning layers 16a and 16b into openings in the permeate conducting layer 18 may reduce severely the porosity of the latter in the direction parallel to the barrier. Although fibrous materials such as paper have low flow conductance parallel to their surface, most fibrous materials have been found to have satisfactory porosities normal to their surface and are suitable for use as cushioning layer materials. Fibrous materials such as compressed paper of the kraft type, and compressed fiber board as used for electrical insulation, have been found to combine porosity with good structural rigidity and are especially well suited for use as cushioning layer materials. Blotter papers, filter papers, glass fiber papers and monofilament woven organic materials are also satisfactory. If glass fibers are used, however, the fiber diameters should be less than about 15 microns to make the cushioning layer flexible and prevent puncturing the fragile barrier. Due to the softness of blotter papers and filter papers and the like, special precautions must be taken to provide their adequate support against the permeate conducting layer 18.

Materials suitable for use as the cushioning layers 12a and 12b are not suitable for use as the permeate conducting layer 18. This is not only true for relatively soft compressible materials such as the botter papers and filter papers previously mentioned, but it is also true for relatively hard-surface sheets such as kraft paper. Such materials as kraft paper are unsatisfactory even when modified by being perforated with long diagonal slots and by stacking the paper so that the slots of adjacent layers crossed to form continuous channels within the stack. Under 1000 p.s.i. compression, a stack of such modified paper showed a conductivity of only 15–25 darcies. Inspection showed that the sheets were heavily embossed by the slots indicating that severe obstruction had occurred in the flow channels.

The type of material chosen for the permeate-conducting layer 18 must be substantially imcompressible and must have a flow conductance parallel to its surface when sandwiched and compressed between two cushioning layers greater, preferably by an order of magnitude, than the combined permeabilities of the barrier layers 12a and 12b.

High porosity in the permeate conducting layer 18 is very important because the flow path of the permeate through this material may be quite long and the cross section area for flow is quite small. Thus, the length of the flow path may be from the most remote point on the septum to a distant withdrawal manifold a length of perhaps several inches. The cross section area of the flow path through the permeate-conducting layer 18 is only the thickness of the permeate conducting layer which is substantially less than the permeation septum thickness, yet this narrow cross section must conduct the combined permeate from both large surface barrier layers 12a and 12b forming sides of the permeation septum. In contrast, the length of the flow path through each cushioning layers 16a and 16b is only the thickness of the material or a small fraction of an inch, while its superficial area for flow is essentially the total surface area of the permeation septum.

Suitable materials for use as a permeate-conducting layer have been found to include wire screen and perforated, rigidized (corrugated) metal sheet. An exceptionally attractive material is 14 x 18 mesh steel screen commonly available as window screen.

The nonporous permeable barrier layers 12a and 12b may be organic, inorganic, or metallic materials, or combinations thereof. By way of non-limiting examples, materials selected from the silicone rubber class are suitable for selectively enriching oxygen in an air mixture, palladium, and palladium alloys are suitable for selectively enriching hydrogen in a gaseous mixture, and fluorinated plastic membranes are suitable for enriching hydrogen or helium in a gaseous mixture containing one or the other.

Tests conducted to determine the suitability of composite support structures constructed of various combinations of cushioning layer and permeate-conducting layer materials are summarized in Table I.

TABLE I

| Test | Permeate Conducting Layer | Cushioning Layer | Flow Conductance at 1,000 p.s.i. Compression darcy |
|---|---|---|---|
| 1 | Single thickness steel screen 14 x 18 mesh. | 3 thicknesses 40 lbs.[1] basis kraft paper. | 66 |
| 2 | ----do---- | Single thickness 100 lbs. basis kraft paper. | 97 |
| 3 | ----do---- | Single thickness 154 lbs. basis woodpulp board. | 102 |
| 4 | ----do---- | Single thickness 178 lbs. basis board. | 112 |
| 5 | ----do---- | Single thickness, 10 mil thick cotton fiber paper. | 111 |
| 6 | Single thickness tinned screen 24 x 24 x 32 ga. | 3 thicknesses filter paper. | 76 |
| 7 | 2 thickness tinned screen 24 x 24 32 ga. | ----do---- | 361 |
| 8 | 2 thicknesses steel screen 14 x 18 mesh (nested 14 x 18 on 14 x 18). | Single thickness 154 lbs. basis woodpulp board. | 548 |
| 9 | 2 thicknesses steel screen 14 x 18 mesh (rotated 90° 14 x 18 on 18 x 14). | ----do---- | 546 |

[1] Weight of 3,000 sq. ft. of paper or paperboard.

The combinations of Table I were tested in septa covered with 2 mil thick barrier layers of a fluorinated plastic comprising a copolymer of tetrafluoroethylene and hexafluoropropylene. In all examples the barrier layers were satisfactorily supported at 1000 p.s.i. compression without puncture or failure.

Table I shows that the heavier, more rigid fiber boards and papers produce better combinations than lighter weight cushions. It is also seen that the harder surface kraft-type papers are better than the softer filter-type papers. Most dramatic, however, is the increased flow conductance obtained by using more than one thickness of screen for the permeate conducting layer. All these effects are believed to derive from the relative resistance of the cushion layers against being embossed into the screen matrix.

The 14 x 18 mesh steel screen reported in Table I is ordinary window screen and is one of the lowest cost metallic materials obtainable for the permeate conducting layer. This material successfully withstands compression above 1000 p.s.i. without damage or significant thickness reduction. Together with kraft paper as a cushioning layer, it is seen that the construction offers a very economic septum for permeation processes.

The materials selected for the septum must be compatible with the conditions of permeation and with the chemical properties of the fluids. For example, the kraft paper and similar material used in the combinations of Table I are suitable for relatively low temperature operation as might be employed for helium recovery from natural gas. Other processes such as hydrogen recovery and purification are conducted at elevated temperatures, e.g. 400° C., where most organic materials are not suitable.

A palladium barrier as used in hydrogen permeation is extremely difficult to support adequately. Not only does it expand and contract greatly due to the extreme temperature cycling of the septum, but it also undergoes marked dimensional change due to solution of hydrogen into the metal. As a result, the barrier tends to wrinkle severely causing cracks and pin holes to develop in its surface.

Hydrogen permeation tests have shown that palladium barriers are adequately supported by the septum of this invention. Materials suitable for the cushioning layers are glass fiber webs, glass cloth and carbon fiber mats. A preferred material is woven glass cloth. Materials suitable for the permeate conducting layer are metallic screens such as stainless steel, and perforated-and-corrugated metal sheets. The latter material has a very high flow conductance and gives excellent results.

Best practice with palladium barriers is to insert a smooth, highly perforate metal sheet as a cushion support layer between the permeate conducting layer and the cushioning layer. This presents an essentially flat, rigid surface for supporting the cushioning layer, which further minimizes compressive stresses in the delicate membrane. These perforate sheets are especially important when corrugated-and-perforated material is used for the permeate conducting layer 18.

Specific specifications for the components of an exemplary hydrogen permeation septum are as follows:

Permeate conducting layer: 302 stainless steel sheet, .022 in. thick, perforated .045 in. diam. holes, 27% open area, cross-corrugated 3.5/inch on diamond pattern, projected thickness .059 in.–.061 in.

Cushion support layer: 304 stainless steel sheet, .012 in.–.013 in. thick (No. 30 U.S. gauge) perforated .020 in. diam. holes, 26% open area.

Cushioning layer: 17.67 oz. fiber glass filter cloth, .020 in. thick, 48 x 24 count, 2 x 2 reverse twill weave.

Barrier: .001 in. thick, 25% silver-palladium alloy foil.

FIGURES 2 and 3 show a preferred embodiment of the permeation septum 10. Nonporous, selectively permeable barriers 12a and 12b are constructed in the form of thin membranes which are supported by a supporting structure 14 comprising cushioning layers 16a and 16b, constructed of fibrous material, and permeate-conducting layer 18, constructed of wire screen. A permeate-collecting manifold 20 in the form of a thin strip is positioned in fluid communication with the permeate-conducting layer 18 so that permeated fluid can be withdrawn through openings 32 in the permeation septum 10. The edges of the membranes 12a and 12b are suitably bonded together such that the membranes form an envelope enclosing the supporting structure.

If it is desired to stack a plurality of permeation septa, such as 10, two thin strips 20 may comprise the permeate-collecting manifold and may be positioned, one on each side of the support structure 14, in fluid communication with the permeate-conducting layer 18. Then, when the permeation septa are stacked together, the thickness of the thin strips will provide adequate separation between adjacent permeation septum for the circulation of high pressure fluid. Furthermore, by aligning the openings in each permeation septum, a manifold conduit on the top or bottom of the stacked assembly, or at both locations, can be added to collect the permeated fluid from each individual permeate-collecting manifold.

It is preferred that the manifold strip 20 be positioned between the cushioning layer (16a or 16b) and the permeate-conducting layer 18 in order to completely eliminate any embossing of the cushion into the conducting layer in the manifold area. Permeate traffic is heaviest in the manifold area, and the force tending to emboss the cushion is greatest here because of the added gasketing compression.

The FIGURE 2 embodiment also shows a preferred manner of fluid tightly sealing the permeation septum 10 about the edges. The two membranes 12a and 12b extend beyond the edges of the support structure 14 and are fluid-tightly joined about their peripheries to form an envelope. This type of seal permits the permeation septum 10, and particularly the two membranes 12a and 12b to expand or contract depending on the surrounding temperature and pressure conditions. When a permeation septum 10 is constructed as shown in FIGURE 2, the nonporous, selectively permeable barrier layers are completely supported from their inner surfaces by support structure 14—no outer peripheral framework or the like need be used.

If it is desired to suspend or align a plurality of permeation sepa, such as 10, in a row or column, a permeate-collecting manifold, for example in the form of a tube 20 shown in FIGURE 4, may be positioned at one edge of each septum rather than in the middle of each septum as shown in FIGURES 2 and 3. These tubes may then be connected together by a manifold conduit adapted to collect the permeated fluid from each individual permeate-collecting manifold.

The arrangement of the permeate collecting manifold is important because it determines the maximum length flow path traversed by the permeate through the interior of the septum. Preferably, the permeate collecting manifold should be aligned with the length of the septum and preferably along the center-line thereof. In the case of very wide septa and high permeate rates, a plurality of permeate collecting manifolds may be desirable which are spaced parallel apart, thereby dividing the septum into areas equally accessible to a permeate withdrawal point.

Furthermore, in the preferred embodiment the shape of the flat septum will be similar to a long rectangle aligned with the longitudinal axis of the permeation chamber so as to extend the residence time of the fluid mixture in the permeation zone while yet maintaining a low economic diameter for the permeation chamber. Thus, the permeate collecting manifold will preferably be aligned with the axis of the chamber and the direction of flow of the permeate within the septum will be 90° to the direction of the fluid mixture flow outside of the septum.

FIGURE 5 shows another permeate-collecting manifold arrangement. In this embodiment, sides of edge conduits 22a and 22b are connected to the septum 10 in fluid communication with the permeate-conducting layer 18 and one end of each edge conduit is connected in fluid communication to permeate-collecting manifold 20 constructed in the form of a tube. Permeated fluid in permeate-conducting layer 18 is conducted to the end conduits 22a and 22b and then into permeate-collecting manifold 20. This arrangement is particularly applicable when it is desirable to spirally wrap septum 10 around a spool to provide a large barrier surface area in a minimum of space. When septum 10 is wrapped to take a spiral configuration, as shown by FIGURE 6, permeate-collecting manifold 20 is preferably positioned at the inner end of the spiral and the outer end of septum 10 is fluid-tightly sealed by means such as rod 24. Rod 24 is provided for convenience in wrapping the septum 10 into a spiral roll.

The permeation septum of the present invention is particularly suited for use in large permeation processes. FIGURE 7 shows the upper section of a centrally-supported stack of permeation septa that could include over a hundred septa. These septa 10a, 10b, and 10c are similar to the one described previously with reference to FIGURES 2 and 3. A manifold conduit 26 is mounted on top of the outer septum 10a in fluid communication with the individual permeate cross-flow manifolds of each septum which are shown in FIGURE 7 as vertically-aligned openings 32.

Where a plurality of permeation septa are stacked as shown in FIGURE 7, adjacent septa such as 10a and 10b must be fluid-tightly connected by some means to prevent the high pressure fluid mixture from leaking between them into the permeate cross-flow manifolds. If the nonporous, selectively permeable barriers 12a and 12b of each septa are constructed of a material that can be joined or fused to itself, such joining or fusing at the contact points 28 between adjacent septa will provide a satisfactory seal. If the barriers are not constructed of such material, or if it is otherwise desirable to not join or fuse them together, sealing means in the form of a gasket or the like must be positioned between adjacent septa at the contact points 28. The sealing means must of course be selected to be compatible with the fluids and conditions of service. Copper gaskets are suitable for high temperature, hydrogen service. Several materials found suitable for sealing against helium leakage at moderate temperatures are shown in Table II.

TABLE II.—GASKET MATERIALS FOR HELIUM SERVICE

| Material | Thickness, in. | Leakage rate per foot of gasket length, cc./sec. |
| --- | --- | --- |
| Cork and Buna Rubber Composition | .031 | .0103 |
| Synthetic rubber-coated fabric | .029 | .0011 |
| Pressure-sensitive plastic tape, double-coated vinyl | .016 | .0013 |

FIGURE 8 shows a stacked assembly of septa, as shown in detail by FIGURE 7, which is placed within a high pressure vessel 30. The high pressure fluid mixture to be separated by selective permeation is introduced into one end of pressure vessel 30, and selectively permeated into the septa. The permeated fluid is collected in permeate cross-flow manifold opening 32 and conducted to manifold conduits 26a and 26b wherein it is conducted from the pressure vessel 30. The high pressure fluid mixture passes longitudinally through vessel 30, and the unpermeated fraction or exhaust fluid is conducted out of the pressure vessel 30 through the end opposite the fluid mixture inlet. An advantage of centrally supporting and manifolding the individual septa, as shown in FIGURE 7, is that the pressure drop of the fluid mixture longitudinally through the pressure vessel 30 is minimized. There is no sptum peripheral supporting framework present to impede the fluid mixture flow or to increase the septum thickness.

Regardless of the sealing method employed between the stacked septa of FIGURE 8, staying means should be provided through the stacked assembly to lend overall rigidity and to prevent damage to the membrane material within the sealing area. If gaskets, cements, or the like are used for sealing, the stays must also provide sealing compression around points of communication between septa to avoid leakage of mixture into the permeate. FIGURE 9 shows a satisfactory staying arrangement. Openings 34 in each septum are located between permeate cross-flow manifold openings 32 (see FIGURE 8). A threaded, high tensile strength bolt 36 is inseerted through each set of vertically aligned openings 34 and also through special sleeves in manifold conduits 26a and 26b. The complete assembly is then compressed by means of nuts 38a and 38b. The special sleeves through manifold conduits 26a and 26b comprise tubes 40a and 40b respectively which are welded fluid-tightly through diametrically drilled holes in the manifold. Tubes 40a and 40b are placed in alignment with each set of vertically aligned openings 34, and nuts 38a and 38b may be adequately tightened without causing the manifold conduits 26a and 26b to collapse. O-ring seals 42a and 42b, or the like, are positioned between the bolt 36 and the tubes 40a and 40b to fluid-tightly seal the openings 34 from high pressure fluid mixture leakage.

Prior to assembling the septa as shown in FIGURES 7 and 9, inlet and outlet baffles, such as inlet baffle 44 shown in FIGURE 10, and intermediate supports 46 are connected to the bottom manifold conduit 26b. A base structure 48 is placed over the baffle 44 and intermediate supports 46. Similar baffles, intermediate supports, and base structures are attached to the upper manifold conduit 26a and then the septa are stacked and tightly connected. After the septa are stacked and tightly connected as shown in FIGURES 7 and 9, the leading and trailing edges of adjacent septa are preferably separated by separating means 50 as shown in FIGURE 10 to provide uniform inlet and outlet passages between the septa for the high pressure fluid mixture. Tie rods 52 are inserted through vertically aligned openings in the septa edges, the separating means 50 and the base structure and secured by nuts 54. The baffles, support structures, and separating means are designed to provide a uniform high pressure fluid mixture mass flow rate throughout the pressure vessel 30. This permits the maximum use of the available permeable barrier surface area.

One important feature of the septum of this invention is its relative incompressibility. The materials chosen for the permeate conducting layer are of necessity very stable structures which retain their void fractions under the high compressive forces of service. Since the stable permeate conducting layer represents a large fraction of the total septum thickness, the septum retains most of its original thickness when placed under service pressure. Thus, the permeation chamber will be completely filled with septa during operation with only sufficient predetermined void space between septa to accommodate feed flow. Combining the advantages of incompressibility and extreme thinness, the septum of this invention provides a means of installing huge areas of barrier in small space.

A helium permeation chamber 20 in. in diameter and 45 ft. long in accordance with the above description may readily contain 190 septa for a total barrier surface area of 18,000 sq. ft. Individual septa will be only .040 to .060 in. thick, and adequate space will remain between septa for feed mixture flow. Such compactness permits huge barrier surface area to be installed directly within a large pipe or conduit. It will be apparent that the permeate fraction thus recovered may be subjected to one or more additional permeation steps and thereby obtain further enrichment of the helium product.

The improved septum of this invention probably shows its greatest advantage for hydrogen permeation because of the extremely high permeation rates involved. The permeation rates of palladium alloys, under conditions normally met in service, are 2 to 3 orders of magnitude greater than those exhibited by fluorocarbon membranes for helium recovery. Nevertheless, the advantages of the invention are quite apparent even for the relatively low permeability barriers, for example, if the above described 18,000 sq. ft. permeation unit having .001 in. thick barrier layers of a copolymer of tetrafluoroethylene and hexafluoropropylene were installed to recover helium from a natural gas stream at 745 p.s.i.g. and 158° F. with the following composition:

| | Percent |
|---|---|
| $CH_4$ | 72 |
| $N_2$ | 18 |
| He | 0.45 |
| $C_2$, etc. | 9.55 | and maintaining a pressure on the permeate side of about 0.1 atm. abs., a permeate stream of 5% helium composition can be obtained in a single stage at a rate of approximately 2,270 c.f.h. NTP. Furthermore, over 80% of the total helium in the feed may be recovered.

In contrast, had the membrane support been constructed entirely of resilient materials such as 15-darcy unbonded cellulose paper, its compressed thickness required for equal flow conductance would have been nearly twice as great and its uncompressed thickness about six times as great. The cost ratio of the septa alone would be about 4 in favor of this invention, and this factor should be further increased by the savings in the permeation chamber which could be made much smaller or provided in fewer number.

Whereas the discussion herein has centered about gas separations, the utility of the improved septum is by no means limited to gaseous processes. Liquid permeation processes are also contemplated, for example the desalinization of sea water. In such system, a semi-permeable barrier layer will separate pure water from salt water, and the salt water must be under at least sufficient pressure to counterbalance the osmotic pressure of the solution. A practical desalinization plant would require huge surface area of semi-permeable barrier layers supported on very low-cost septa. The septum of this invention is ideally suited to this use.

Another use of this septum is for the separation of benzene and ethanol in liquid phase. In one test, a polyethylene film was supported on a septum as described in item 3 of Table I. A 35 (volume) percent benzene-in-ethanol feed was admitted to the outside of the septum at 68° C., and permeate was withdrawn from the interior under a 660 mm. Hg pressure differential. The permeate composition was 83% benzene, and the permeability constant was $$1.79 \times 10^{-7} \frac{cm.^3 - cm.}{sec. - cm.^2}$$

Still another example of utility in liquid separation is the removal of water from fluid substances such as whole blood and plasma in order to concentrate them for economic refrigeration and storage. The usual concentration method is by centrifuging, but this causes considerable damage to the red cells. A cellophane membrane was supported on a structure of 14 x 18 mesh screen and 154 lb. paper board (item 3, Table I). This septum was immersed in human blood plasma at 35.5° C., and under a pressure difference of 743 mm. Hg a water-clear liquid permeate was collected having the same index of refraction as distilled water. The permeability constant was $$1.92 \times 10^{-8} \frac{cm.^3 - cm.}{sec. - cm.^2}$$

When immersed in Type A whole blood, the same clear permeate was obtained with a permeability constant of $$1.42 \times 10^{-8} \frac{cm.^3 - cm.}{sec. - cm.^2}$$

A hemolysis determination performed on the remaining blood showed negligible red cell damage had occurred during the process.

What is claimed is:

1. Apparatus for the separation of fluids by selective permeation through nonporous, selectively permeable barriers which comprises two nonporous, selectively permeable barriers; a porous support structure positioned between the barriers and constructed of a permeate-conducting layer characterized by having a flow conductance parallel to its surface greater than the combined permeabilities of the barriers, and a fibrous cushioning layer on each side of said permeate-conducting layer characterized by having a porosity normal to its surface greater than the permeability of each barrier, said porous support structure being arranged in relation to said barriers such that each barrier is contiguously supported by one of said cushioning layers; and a permeate-collecting manifold in fluid communication with said permeate-conducting layer.

2. Apparatus according to claim 1 wherein said permeate-conducting layer comprises a sheet of wire screen.

3. Apparatus according to claim 1 wherein said permeate-conducting layer comprises a sheet of perforated, rigidized metal.

4. Apparatus according to claim 1 wherein each barrier comprises a fluorinated membrane, and said permeate conducting layer comprises a sheet of wire screen.

5. Apparatus according to claim 1 wherein said premeate-collecting manifold comprises material constructed in the form of a thin strip with openings therein in fluid communication with said permeate-conducting layer.

6. Apparatus for the separation of fluids by selective permeation through nonporous, selectively permeable barriers which comprises a plurality of permeation septa, each having two nonporous selectively permeable barriers a porous support structure positioned between the barriers and constructed of a permeate-conducting layer characterized by having a flow conductance parallel to its surface greater than the combined permeabilities of the barriers, and a cushioning layer on each side of said of said permeate-conducting layer characterized by having a porosity normal to its surface greater than the permeability of each barrier, said porous support structure being arranged in relation to said barriers such that each barrier is contiguously supported by one of said cushioning layers, and a permeate-collecting manifold in fluid communication with said permeate-conducting layer; means in fluid communication with the permeate-collecting manifold of each permeation septa for collecting the permeate therefrom.

7. Apparatus for the separation of fluids by selective permeation through nonporous, selectively permeable barriers which comprises a plurality of elongated permeation septa, each having two nonporous selectively permeable barriers, a porous support structure positioned between the barriers and constructed of a permeate-conducting layer characterized by having a flow conductance parallel to its surface greater than the combined permeabilities of the barriers, and a cushioning layer on each side of said permeate-conducting layer characterized by having a porosity normal to its surface greater than the permeability of each barrier, said porous support structure being arranged in relation to said barriers such that each barrier is contiguously supported by one of said cushioning layers, and an elongated centrally-positioned permeate-collecting manifold having at least one opening in fluid communication with said permeate-conducting layer, said permeation septa being centrally supported and arranged such that openings in each of the permeate-collecting manifolds are in alignment; means for fluid-tightly connecting the aligned openings in adjacent permeation septa such that the permeate can pass through the aligned openings in the permeate manifolds; means in fluid communication with the openings in the permeate-collecting manifolds for collecting the permeate therefrom comprising a manifold conduit attached to the outer permeation septum having openings in communication with the openings in the permeate-collecting manifolds; a pressure vessel enclosing the plurality of elongated septa and having fluid mixture inlet and outlet means.

References Cited

UNITED STATES PATENTS

| | | | |
|---|---|---|---|
| 2,735,812 | 2/1956 | Van Hoek | 210—321 |
| 2,824,620 | 2/1958 | DeRosset | 55—158 |
| 2,958,657 | 11/1960 | Binning et al. | 55—16 |
| 3,133,132 | 5/1964 | Loeb et al. | 210—321 |

FOREIGN PATENTS 1,139,474  11/1962  Germany.

OTHER REFERENCES

Osburn et al., New Diffusion Cell Design, in Ind. & Eng. Chem. 46(4), pp. 739–742, April 19, 1954.

REUBEN FREIDMAN, *Primary Examiner.*

J. W. ADEE, *Assistant Examiner.*